(12) United States Patent
Kim et al.

(10) Patent No.: US 9,610,937 B2
(45) Date of Patent: Apr. 4, 2017

(54) APPARATUS AND METHOD FOR CONTROLLING TORQUE REDUCTION OF HYBRID ELECTRIC VEHICLE

(71) Applicant: Hyundai Motor Company, Seoul (KR)

(72) Inventors: Do Hee Kim, Gyeonggi-do (KR); Teh Hwan Cho, Gyeonggi-do (KR); Gwang Il Du, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/940,314

(22) Filed: Nov. 13, 2015

(65) Prior Publication Data

US 2017/0066430 A1    Mar. 9, 2017

(30) Foreign Application Priority Data

Sep. 4, 2015  (KR) .......................... 10-2015-0125619

(51) Int. Cl.
| | | |
|---|---|---|
| *B60W 20/13* | (2016.01) | |
| *B60L 11/12* | (2006.01) | |
| *B60K 6/485* | (2007.10) | |
| *B60K 6/48* | (2007.10) | |
| *B60W 20/40* | (2016.01) | |
| *B60K 6/445* | (2007.10) | |

(Continued)

(52) U.S. Cl.
CPC ............ *B60W 20/13* (2016.01); *B60W 10/06* (2013.01); *B60W 10/08* (2013.01); *B60W 2510/244* (2013.01); *B60W 2520/30* (2013.01); *B60W 2710/0666* (2013.01); *B60W 2710/083* (2013.01); *B60W 2720/26* (2013.01); *B60Y 2200/92* (2013.01); *B60Y 2300/18175* (2013.01); *Y10S 903/93* (2013.01)

(58) Field of Classification Search
CPC ....... B60W 20/13; B60W 20/40; B60L 11/12; B60K 6/485; B60K 6/48; B60K 6/445; G01R 31/3679; G01R 31/3651
See application file for complete search history.

(56) References Cited

U.S. PATENT DOCUMENTS 5,959,420 A * 9/1999 Boberg .................. B60L 11/12
                                                                        180/282
6,362,536 B1 * 3/2002 Izumiura ................ B60K 6/485
                                                                       180/65.26

(Continued)

FOREIGN PATENT DOCUMENTS

JP      2006-144589 A    6/2006
KR      10-1490954 B1    2/2015

*Primary Examiner* — Yuri Kan
(74) *Attorney, Agent, or Firm* — Mintz Levin Cohn Ferris Glovsky and Popeo, P.C.; Peter F. Corless

(57) ABSTRACT

A method for controlling torque reduction of a hybrid electric vehicle including a motor and an engine as a power source includes: determining whether a request for a driving torque limit by a traction control system (TCS) is generated; calculating a motor torque command when the request for the driving torque limit by the TCS is generated; calculating an engine torque command based on the calculated motor torque command; calculating an available amount of charging of the motor according to a state of charge (SOC) of a battery of the hybrid electric vehicle; and determining a final motor torque command and a final engine torque command based on the calculated available amount of charging of the motor.

15 Claims, 3 Drawing Sheets

(51) Int. Cl.
*B60W 10/06* (2006.01)
*B60W 10/08* (2006.01)

(56) References Cited

U.S. PATENT DOCUMENTS

| | | | |
|---|---|---|---|
| 6,453,249 B1 * | 9/2002 | Shibutani | G01R 31/3679 320/132 |
| 7,741,849 B2 * | 6/2010 | Frey | G01R 31/3651 324/427 |
| 2003/0034188 A1 * | 2/2003 | Gotou | B60W 20/40 180/65.225 |
| 2005/0065690 A1 * | 3/2005 | Ashizawa | B60K 6/48 701/51 |
| 2007/0125083 A1 * | 6/2007 | Rollinger | B60K 6/48 60/605.1 |
| 2013/0338861 A1 * | 12/2013 | Hessell | B60K 6/445 701/22 |

* cited by examiner

APPARATUS AND METHOD FOR CONTROLLING TORQUE REDUCTION OF HYBRID ELECTRIC VEHICLE

CROSS-REFERENCE TO RELATED APPLICATION

This application claims priority to and the benefit of Korean Patent Application No. 10-2015-0125619 filed in the Korean Intellectual Property Office on Sep. 4, 2015, the entire contents of which are incorporated herein by reference.

BACKGROUND OF THE DISCLOSURE (a) Technical Field

The present disclosure relates generally to an apparatus and a method for controlling torque reduction of a hybrid electric vehicle. More particularly, the present disclosure relates to an apparatus and a method for controlling torque reduction of a hybrid electric vehicle that determines an engine torque command and a motor torque command to satisfy a request for driving torque limit by a traction control system (TCS) and a state of charge (SOC) of a battery.

(b) Description of the Related Art

A hybrid vehicle is a vehicle using two or more different types of power sources and is typically a vehicle that is driven by an engine that obtains a driving torque by burning fuel and a motor that obtains a driving torque by battery power. Hybrid electric vehicles can be provided with optimum output torque, depending on how the engine and the motor are operated while the vehicles are driven by the two power sources, that is, the engine and the motor.

Meanwhile, a traction control system (TCS) is a safety system for preventing wheel spin and improving driving stability by controlling the brakes and the engine during takeoff or acceleration. The TCS is typically provided with the hybrid electric vehicle and requests to limit driving torque when the wheel spin occurs during takeoff or acceleration. Particularly, the hybrid electric vehicle is provided with two power sources. i.e., engine and the motor, so the engine and the motor may be utilized when the TCS requests for driving torque limit.

Conventionally, if a request for driving torque limit by the TCS is generated when the TCS requests torque reduction, the hybrid electric vehicle decreases an engine torque at first. Then, if the decreased engine torque cannot satisfy an amount of the request for driving torque limit by the TCS, the hybrid electric vehicle decreases a motor torque to satisfy the amount of the request for driving torque limit by the TCS.

However, in case that the request for driving torque limit by the TCS is satisfied by using the motor torque after the engine torque becomes 0 (i.e., the engine only outputs a torque to compensate an engine friction torque), a state of charge (SOC) of the battery runs out due to continuous use of the motor, so power performance of the motor is deteriorated. Moreover, a demand torque of a driver cannot be satisfied while the TCS continuously operating, so the hybrid electric vehicle cannot start smoothly again.

The above information disclosed in this Background section is only for enhancement of understanding of the background of the disclosure, and therefore, it may contain information that does not form the related art that is already known in this country to a person of ordinary skill in the art.

SUMMARY OF THE DISCLOSURE

The present disclosure has been made in an effort to provide an apparatus and a method for controlling torque reduction of a hybrid electric vehicle having advantages of determining an engine torque command and a motor torque command to satisfy a request for driving torque limit by a traction control system (TCS) and a state of charge (SOC) of a battery.

Embodiments of the present disclosure provide a method for controlling torque reduction of a hybrid electric vehicle including a motor and an engine as a power source that includes: determining whether a request for a driving torque limit by a traction control system (TCS) is generated; calculating a motor torque command when the request for the driving torque limit by the TCS is generated; calculating an engine torque command based on the calculated motor torque command; calculating an available amount of charging of the motor according to a state of charge (SOC) of a battery of the hybrid electric vehicle; and determining a final motor torque command and a final engine torque command based on the calculated available amount of charging of the motor.

The method may further include calculating the motor torque command based on a charging limit torque of the motor and the SOC of the battery.

The method may further include calculating the engine torque command based on a difference between an amount of the request for the driving torque limit and an amount of the motor torque command.

The method may further include calculating the available amount of charging of the motor based on a maximum available amount of charging of the motor and an adjusting factor of the maximum available amount of charging of the motor.

The method may further include calculating the adjusting factor using a transcendental function of which a maximum value is decreased from 1.

Furthermore, according to embodiments of the present disclosure, an apparatus for controlling torque reduction of a hybrid electric vehicle including a motor and an engine as a power source includes: a driving information detector detecting a running state of the hybrid electric vehicle and demand information of a driver of the hybrid electric vehicle; a traction control system (TCS) preventing a wheel slip of the hybrid electric vehicle; and a controller controlling an output torque of the engine and an output torque of the motor based on a signal from the driving information detector, calculating a motor torque command and an engine torque command when a request for a driving torque limit by the TCS is generated, calculating an available amount of charging of the motor according to a state of charge (SOC) of a battery of the hybrid electric vehicle, and determining a final motor torque command and a final engine torque command based on the calculated available amount of charging of the motor.

The controller may calculate the motor torque command based on a charging limit torque of the motor and the SOC of the battery.

The controller may calculate the engine torque command based on a difference between an amount of the request for the driving torque limit and an amount of the motor torque command.

The controller may calculate the available amount of charging of the motor based on a maximum available amount of charging of the motor and an adjusting factor of the maximum available amount of charging of the motor.

The controller may calculate the adjusting factor using a transcendental function of which a maximum value is decreased from 1.

Furthermore, according to embodiments of the present disclosure, a non-transitory computer readable medium containing program instructions for controlling torque reduction of a hybrid electric vehicle including a motor and an engine as a power source includes: program instructions that determine whether a request for a driving torque limit by a traction control system (TCS) is generated; program instructions that calculate a motor torque command when the request for the driving torque limit by the TCS is generated; program instructions that calculate an engine torque command based on the calculated motor torque command; program instructions that calculate an available amount of charging of the motor according to a state of charge (SOC) of a battery of the hybrid electric vehicle; and program instructions that determine a final motor torque command and a final engine torque command based on the calculated available amount of charging of the motor.

The computer readable medium may further include program instructions that calculate the motor torque command based on a charging limit torque of the motor and the SOC of the battery.

The computer readable medium may further include program instructions that calculate the engine torque command based on a difference between an amount of the request for the driving torque limit and an amount of the motor torque command.

The computer readable medium may further include program instructions that calculate the available amount of charging of the motor based on a maximum available amount of charging of the motor and an adjusting factor of the maximum available amount of charging of the motor.

The computer readable medium may further include program instructions that calculate the adjusting factor using a transcendental function of which a maximum value is decreased from 1.

As described above, according to embodiments of the present disclosure, a charging limit torque of the motor and the battery SOC is considered to determine a motor command torque, so a lack of the battery SOC can be prevented and power performance of the motor can be secured. In addition, a problem that a demand torque of a driver is not satisfied due to exhaustion of the battery SOC can be prevented and fuel efficiency and torque responsiveness of the hybrid electric vehicle can be improved.

DETAILED DESCRIPTION OF THE EMBODIMENTS

Figure 1:
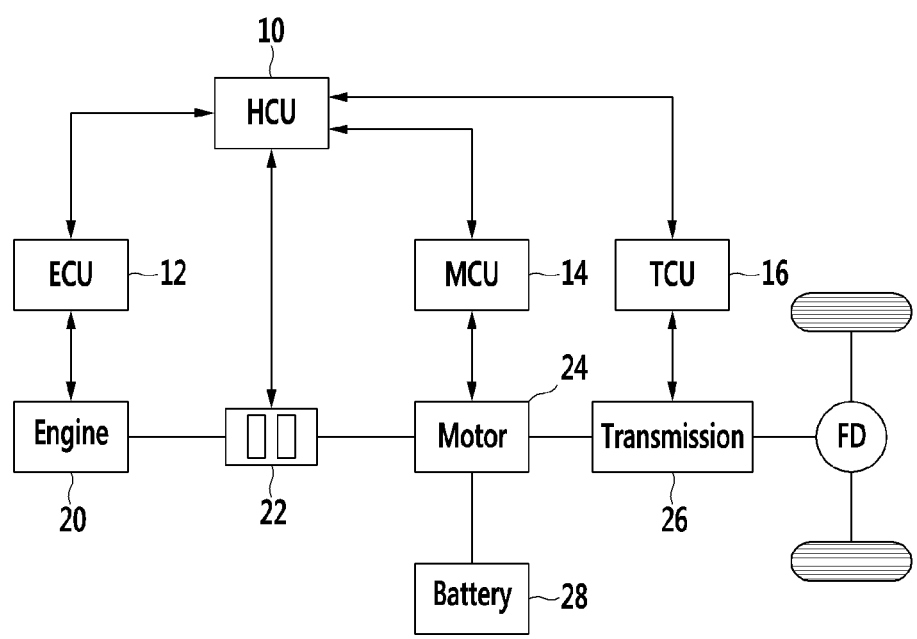
FIG. 1 is a schematic diagram of a hybrid system to which a method for controlling torque reduction of a hybrid electric vehicle is applied according to embodiments of the present disclosure.

In the following detailed description, only certain embodiments of the present disclosure have been shown and described, simply by way of illustration. As those skilled in the art would realize, the described embodiments may be modified in various different ways, all without departing from the spirit or scope of the present disclosure. Like reference numerals designate like elements throughout the specification.

The terminology used herein is for the purpose of describing particular embodiments only and is not intended to be limiting of the disclosure. this specification and the claims which follow, the singular forms "a", "an" and "the" are intended to include the plural forms as well, unless the context clearly indicates otherwise. Further, unless explicitly described to the contrary, the word "comprise" and variations such as "comprises" or "comprising" will be understood to imply the inclusion of stated elements but not the exclusion of any other elements.

It is understood that the term "vehicle" or "vehicular" or other similar term as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

Embodiments of the present disclosure will hereinafter be described in detail with reference to the accompanying drawings.

FIG. 1 is a schematic diagram of a hybrid system to which a method for controlling torque reduction of a hybrid electric vehicle is applied according to embodiments of the present disclosure.

The hybrid system shown in FIG. 1 is illustrated for better comprehension and ease of description. Therefore, a method for controlling engine starting while shifting of a hybrid electric vehicle according to embodiments of the present disclosure may not only be applied to the hybrid system as shown in FIG. 1, but may also be applied to all other hybrid systems.

As shown in FIG. 1, the hybrid system to which a method for controlling torque reduction of a hybrid electric vehicle is applied according to embodiments of the present disclosure includes a hybrid control unit (HCU) 10, an electronic control unit (ECU) 12, a motor control unit (MCU) 14, a transmission control unit (TCU) 16, an engine 20, an engine clutch 22, a motor 24, a transmission 26, and a battery 28.

The HCU 10 controls operation of other controllers which mutually exchange information in an entire operation of a hybrid electric vehicle, so that the HCU 10 controls output torque of the engine 20 and the motor 24 by cooperating with the other controllers.

The ECU 12 controls an entire operation of the engine 20 according to conditions of the engine 20, such as a demand torque of a driver, a coolant temperature, and an engine torque.

The MCU 14 controls an entire operation of the motor 24 according to a demand torque of a driver, a driving mode of the hybrid electric vehicle, and an SOC condition of the battery 28.

The TCU 16 controls an entire operation of the transmission 26 such as speed ratios of the transmission 26 depending on output torque of the engine 20 and the motor 24, and an amount of regenerative braking.

The engine 20 outputs power as a power source while turned on.

The engine clutch 22 is disposed between the engine 20 and the motor 24 to receive a control signal of the HCU 10, and selectively connect the engine 20 and the motor 24 according to a driving mode of the hybrid electric vehicle.

The motor 24 is operated by a 3-phase AC voltage applied from the battery 28 through an inverter to generate torque, and operates as a power generator and supplies regenerative energy to the battery 28 in a coast-down mode.

The transmission 26 supplies a sum of an output torque of the engine 20 and an output torque of the motor 24 determined by coupling and releasing of the engine clutch 22 as an input torque and selects any shift gear according to a vehicle speed and a driving condition to output driving force to a driving wheel and maintain driving.

The battery 28 is composed of a plurality of unit cells, and stores a high voltage for supplying a voltage to the motor 24, for example, 400 V or 450 V DC.

The hybrid system as described above is obvious to a person of ordinary skill in the art, so a detailed explanation thereof will be omitted.

Figure 2:
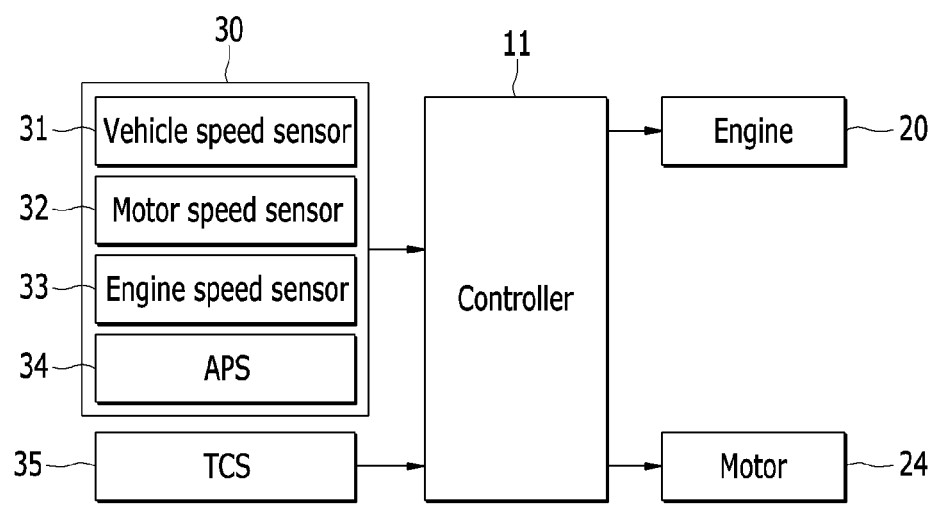
FIG. 2 is a block diagram of an apparatus for controlling torque reduction of a hybrid electric vehicle according to embodiments of the present disclosure.

FIG. 2 is a block diagram of an apparatus for controlling torque reduction of a hybrid electric vehicle according to embodiments of the present disclosure.

As shown in FIG. 2, an apparatus for controlling torque reduction of a hybrid electric vehicle according to embodiments of the present disclosure includes a driving information detector 30, a traction control system (TCS) 35, a controller 11, an engine 20 and a motor 24.

Processes in the method for controlling torque reduction of the hybrid electric vehicle according to the present disclosure to be described below may be performed by integrating or subdividing due to each controller. Therefore, for convenience of description, in this specification and claims, many controllers provided in the hybrid electric vehicle are called the controller 11.

The hybrid electric vehicle to which embodiments of the present disclosure is applied includes at least one engine 20 and at least one motor 24. In addition, the hybrid electric vehicle provides a driving mode in which the engine 20 and the motor 24 operate separately or simultaneously as a power source. For this purpose, the engine clutch is disposed between the engine 20 and the motor 24 to selectively connect the engine 20 and the motor 24.

The driving information detector 30 detects a running state of the hybrid electric vehicle and demand information of a driver and includes a vehicle speed sensor 31, a motor speed sensor 32, an engine speed sensor 33 and an accelerator pedal position sensor (APS) 34.

The vehicle speed sensor 31 detects a speed of the vehicle, and transmits a corresponding signal to the controller 11.

The motor speed sensor 32 detects a rotation speed of the motor 24, and transmits a corresponding signal to the controller 11.

The engine speed sensor 33 detects a rotation speed of the engine 20, and transmits a corresponding signal to the controller 11.

The accelerator pedal position sensor 34 continuously detects a position value of an accelerator pedal and transmits a monitoring signal to the controller 11. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake pipe may be used instead of the accelerator pedal position sensor 34. Therefore, in this specification and the scope of the appended claims, the accelerator pedal position sensor 34 should include the throttle valve position sensor, and the position value of the accelerator pedal should be understood to be an opening value of the throttle valve.

The TCS 35 is a safety system configured to control a driving torque for preventing a wheel spin when the vehicle starts out or accelerates on a snowy road or an icy road. Therefore, when the wheel spin occurs because the hybrid electric vehicle starts out or accelerates on a slippery road, the TCS 35 requests to limit driving torque by outputting a demand torque.

The controller 11 calculates a motor torque command and an engine torque command when a request for driving torque limit by the TCS 35 is generated, calculates an available amount of charging of the motor 24 according to the battery SOC, and determines a final motor torque command and a final engine torque command by reflecting the available amount of charging of the motor 24. In addition, the controller 11 performs torque reduction by controlling an output torque of the engine and an output torque of the motor according to the final motor torque command and the final engine torque command.

For these purposes, the controller 11 may be implemented as at least one processor that is operated by a predetermined program, and the predetermined program may be programmed in order to perform each step of a method for controlling torque reduction of a hybrid electric vehicle according to embodiments of the present disclosure.

Various embodiments described herein may be implemented within a recording medium that may be read by a computer or a similar device by using software, hardware, or a combination thereof, for example. According to a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units designed to perform any other functions. According to a software implementation, embodiments such as procedures and functions described in the present embodiments may be implemented by separate software modules. Each of the software modules may perform one or more functions and operations described in the present disclosure. A software code may be implemented by a software application written in an appropriate program language.

Hereinafter, a method for controlling torque reduction of the hybrid electric vehicle according to embodiments of the present disclosure will be described in detail with reference to FIG. 3.

Figure 3:
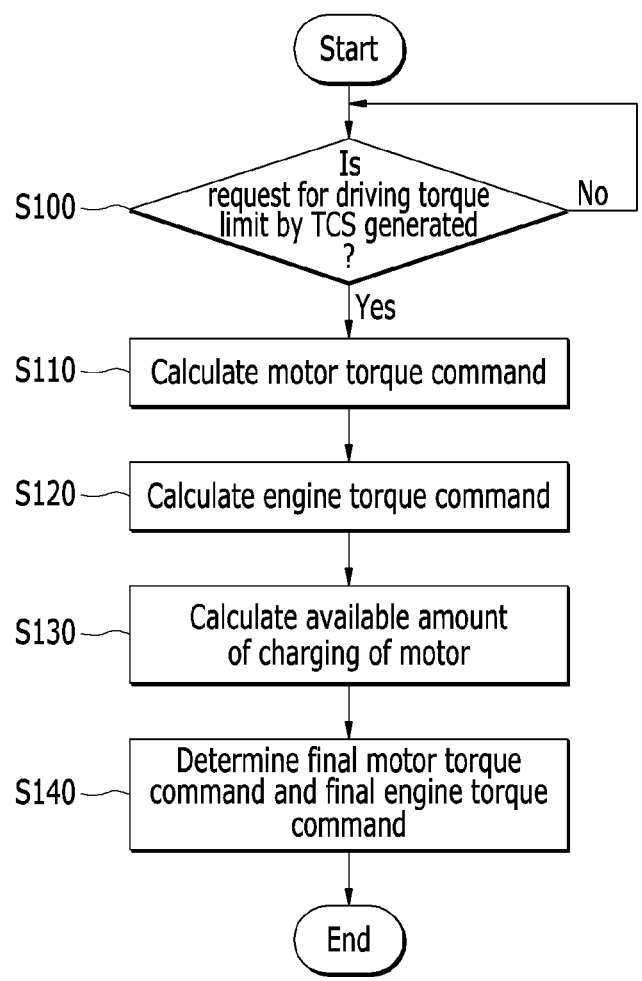
FIG. 3 is a flowchart showing a method for controlling torque reduction of a hybrid electric vehicle according to embodiments of the present disclosure.

FIG. 3 is a flowchart showing a method for controlling torque reduction of the hybrid electric vehicle according to embodiments of the present disclosure.

As shown in FIG. 3, a method for controlling torque reduction of the hybrid electric vehicle according to an exemplary embodiment of the present disclosure starts with determining whether a request for driving torque limit by the TCS 35 is generated at step S100.

When the request for driving torque limit by the TCS 35 is generated at the step S100, the controller 11 calculates a motor torque command at step S110.

The motor torque command may be calculated by multiplying the charging limit torque of the motor 24 by the battery SOC and dividing by 100. If the charging limit torque of the motor 24 is sufficient, it is required to actively use the motor 24 in order to improve fuel efficiency and responsiveness of the hybrid electric vehicle. However, the charging limit torque of the motor 24 is affected by a vehicle speed, so it is difficult to maintain the battery SOC by using the charging limit torque of the motor 24. Therefore, the controller 11 calculates the motor torque command by multiplying the charging limit torque of the motor 24 by the battery SOC and dividing by 100.

When the charging limit torque of the motor 24 is calculated at the step S110, the controller 11 calculates an engine torque command at step S120.

The engine torque command may be calculated by subtracting the motor torque command calculated at the step S110 from an amount of the request for driving torque limit by the TCS 35.

After that, the controller 11 calculates an available amount of charging of the motor 24 according to the battery SOC at step S130. The available amount of charging of the motor 24 according to the battery SOC may be calculated by multiplying a maximum available amount of charging of the motor 24 by an adjusting factor of charging amount. The controller 11 may control to increase a charging amount of the motor 24 when a ratio of the battery SOC is low and decrease the charging amount of the motor 24 when the ratio of the battery SOC is high by using the adjusting factor of charging amount.

The adjusting factor of charging amount may be calculated by using a transcendental function of which a maximum value is decreased from 1. For example, a hyperbolic secant function, a trigonometric function, and an exponential function of which maximum value is 1 may be used.

When the available amount of charging of the motor 24 is calculated at the step S130, the controller 11 determines a final motor torque command and a final engine torque command by reflecting the available amount of charging of the motor 24 at step S140. After that, the controller 11 performs torque reduction by controlling an output torque of the engine and an output torque of the motor according to the final motor torque command and the final engine torque command.

As described above, according to embodiments of the present disclosure, a charging limit torque of the motor and the battery SOC is considered to determine a motor command torque, so a lack of the battery SOC can be prevented and power performance of the motor can be secured. In addition, a problem in which a demand torque of a driver is not satisfied due to exhaustion of the battery SOC can be prevented, and fuel efficiency and torque responsiveness of the hybrid electric vehicle can be improved.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A method for controlling torque reduction of a hybrid electric vehicle including a motor and an engine as a power source, comprising:
    determining whether a request for a driving torque limit by a traction control system (TCS) is generated;
    calculating a motor torque command when the request for the driving torque limit by the TCS is generated;
    calculating an engine torque command based on the calculated motor torque command;
    calculating an available amount of charging of the motor according to a state of charge (SOC) of a battery of the hybrid electric vehicle; and
    determining a final motor torque command and a final engine torque command based on the calculated available amount of charging of the motor.

2. The method of claim 1, further comprising:
    calculating the motor torque command based on a charging limit torque of the motor and the SOC of the battery.

3. The method of claim 2, further comprising:
    calculating the engine torque command based on a difference between an amount of the request for the driving torque limit and an amount of the motor torque command.

4. The method of claim 1, further comprising:
    calculating the available amount of charging of the motor based on a maximum available amount of charging of the motor and an adjusting factor of the maximum available amount of charging of the motor.

5. The method of claim 4, further comprising:
    calculating the adjusting factor using a transcendental function of which a maximum value is decreased from 1.

6. An apparatus for controlling torque reduction of a hybrid electric vehicle including a motor and an engine as a power source, comprising:
    a driving information detector detecting a running state of the hybrid electric vehicle and demand information of a driver of the hybrid electric vehicle;
    a traction control system (TCS) preventing a wheel slip of the hybrid electric vehicle; and
    a controller controlling an output torque of the engine and an output torque of the motor based on a signal from the driving information detector, calculating a motor torque command and an engine torque command when a request for a driving torque limit by the TCS is generated, calculating an available amount of charging of the motor according to a state of charge (SOC) of a battery of the hybrid electric vehicle, and determining a final motor torque command and a final engine torque command based on the calculated available amount of charging of the motor.

7. The apparatus of claim 6, wherein the controller calculates the motor torque command based on a charging limit torque of the motor and the SOC of the battery.

8. The apparatus of claim 7, wherein the controller calculates the engine torque command based on a difference between an amount of the request for the driving torque limit and an amount of the motor torque command.

9. The apparatus of claim 6, wherein the controller calculates the available amount of charging of the motor based on a maximum available amount of charging of the motor and an adjusting factor of the maximum available amount of charging of the motor.

10. The apparatus of claim 9, wherein the controller calculates the adjusting factor using a transcendental function of which a maximum value is decreased from 1.

11. A non-transitory computer readable medium containing program instructions for controlling torque reduction of a hybrid electric vehicle including a motor and an engine as a power source, the computer readable medium comprising:
    program instructions that determine whether a request for a driving torque limit by a traction control system (TCS) is generated;
    program instructions that calculate a motor torque command when the request for the driving torque limit by the TCS is generated;
    program instructions that calculate an engine torque command based on the calculated motor torque command;
    program instructions that calculate an available amount of charging of the motor according to a state of charge (SOC) of a battery of the hybrid electric vehicle; and
    program instructions that determine a final motor torque command and a final engine torque command based on the calculated available amount of charging of the motor.

12. The computer readable medium of claim 11, further comprising:
    program instructions that calculate the motor torque command based on a charging limit torque of the motor and the SOC of the battery.

13. The computer readable medium of claim 12, further comprising:
    program instructions that calculate the engine torque command based on a difference between an amount of the request for the driving torque limit and an amount of the motor torque command.

14. The computer readable medium of claim 11, further comprising:
    program instructions that calculate the available amount of charging of the motor based on a maximum available amount of charging of the motor and an adjusting factor of the maximum available amount of charging of the motor.

15. The computer readable medium of claim 14, further comprising:
    program instructions that calculate the adjusting factor using a transcendental function of which a maximum value is decreased from 1.

* * * * *